# 3,758,485
FURAN CARBOXYLIC ACID PYRIDYLAMIDES
Stanislaw Biniecki, Platnicza str. 38; Piotr Kubikowski, Kredytowa str. 8, m. 7; Wojciech Kostowski, Kredytowa str. 2, m. 20; Wanda Modrzejewska, Grochowska str. 221, m. 13; and Pawel Nantka-Namirski, Swierczewskiego str. 82, m. 122, all of Warsaw, Poland
No Drawing. Filed Mar. 8, 1971, Ser. No. 122,022
Claims priority, application Poland, Mar. 7, 1970, P 139,266; Aug. 26, 1970, P 145,224
Int. Cl. C07d 31/44
U.S. Cl. 260—295 AM   6 Claims

ABSTRACT OF THE DISCLOSURE

Compounds of the formula:

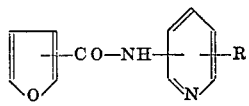
(I)

wherein R is hydrogen or a lower alkyl group of 1–4 carbon atoms and salts thereof are prepared by reacting a compound of the formula:

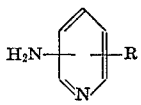
(II)

with a furan carboxylic acid chloride of the formula:

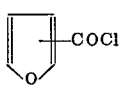
(III)

These compounds have long lasting pressure action and they are also central nervous system stimulants.

BACKGROUND OF THE INVENTION

The present invention relates to novel furan carboxylic acid pyridylamides and their preparation.

SUMMARY OF THE INVENTION

The invention is, in one aspect thereof, a novel class of compounds which are furan carboxylic acid pyridylamides of the formula:

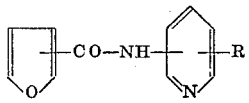
(I)

and salts thereof wherein R is hydrogen or a lower alkyl group of 1–4 carbon atoms. In another aspect, the invention is a method for preparing said compounds comprising reacting an aminopyridine of the formula:

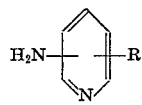
(II)

with a furan carboxylic acid chloride of the formula:

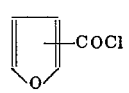
(III)

in an inert organic solvent.

DETAILED DESCRIPTION

According to the invention, furan carboxylic acid pyridylamides of the formula:

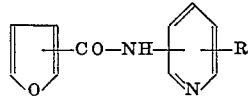
(I)

in which R is hydrogen or a lower alkyl group of 1–4 carbon atoms preferably methyl, and salts of these compounds are produced by reacting an aminopyridine or a derivative thereof having the substituent R as defined above and having the formula:

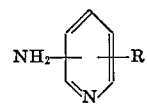
(II)

with a furan carboxylic acid chloride of the formula:

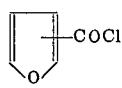
(III)

in an organic solvent. As examples of the organic solvent, there are dioxane and tetrahydrofuran. The reaction is generally effected at an elevated temperature, i.e., about 105–110° C.

The furan carboxylic acid derivatives are obtained in the form of amides or their salts.

The furan carboxylic acid pyridylamides according to the present invention reveal interesting pharmacological action as will appear below.

The following examples explain, without limiting the scope of the invention thereto, how to prepare compounds in accordance with the invention.

Example I.—13 g. of furan-2-carboxylic acid chloride having a melting point of 173° C. are dissolved in 15 ml. of anhydrous dioxane. 9.4 g. of 2-aminopyridine dissolved in 20 ml. of anhydrous dioxane are added in portions to the solution. The mixture is heated on a bath at a temperature of 105–110° C., whereupon the mixture is left standing for crystallization. 21.5 g. of crude furan-2-carboxylic acid 2-pyridylamide hydrochloride with a melting point of 195–200° C. are obtained. This is 96% of the theoretical yield. For purification, the crude product is recrystallized from 96% ethanol. 17.5 g. of furan-2-carboxylic acid 2-pyridylamide hydrochloride with a melting point of 203–205° C. are obtained.

The furan-2-carboxylic acid 2-pyridylamide hydrochloride is converted into the amide through alkalization of a cooled aqueous solution of the hydrochloride with an ammonia solution.

The melting point of furan-2-carboxylic acid 2-pyridylamide is 90–91° C.

Example II.—13 g. of furan-2-carboxylic acid chloride are dissolved in 20 ml. of anhydrous dioxane. To the solution, 9.4 g. of 4-aminopyridine dissolved in 30 ml. of anhydrous dioxane are added in portions. The mixture is heated for 3 hours on a bath at a temperature of 105–110° C., whereupon the mixture is left standing for crystallization. One obtains 20.8 g. of crude furan-2-carboxylic acid 4-pyridylamide hydrochloride with a melting point of 250–254° C. This is 93% of the theoretical yield. For purification, the hydrochloride is recrystallized from 96% ethanol. 16.8 g. of furan-2-carboxylic acid 4-pyridylamide hydrochloride with a melting point of 256–258° C. are obtained.

The furan-2-carboxylic acid 4-pyridylamide hydrochloride is converted into the amide through alkalization of a cooled aqueous solution of the hydrochloride with an ammonia solution.

The melting point of furan 2-carboxylic acid 4-pyridylamide is 161–162° C.

Example III.—13 g. of furan 2-carboxylic acid chloride are dissolved in 15 ml. of anhydrous dioxane. 10.8 g. of 4-methyl-2-aminopyridine dissolved in 40 ml. of anhydrous dioxane are added in portions to the solution. The mixture is heated for 3 hours on a bath at a temperature of 105–110° C. and then it is left standing for crystallization. 20.2 g. of crude furan-2-carboxylic acid 4-methyl-2-pyridylamide hydrochloride with a melting point of 215–220° C. are obtained, which represents 85% of the theoretical yield. For purification, the hydrochloride is recrystallized from 96% ethanol. 15 g. of furan 2-carboxylic acid 4-methyl-2-pyridylamide hydrochloride with a melting point of 224–226° C. are obtained. Furan 2-carboxylic acid 4-methyl-2-pyridylamide hydrochloride is converted into the amide through alkalization of a cooled aqueous solution of the hydrochloride with an ammonia solution. The melting point of furan 2-carboxylic acid 4-methyl-2-pyridylamide is 104–106° C.

The furan carboxylic acid derivatives of the Formula I can generally be divided into two groups according to the nature of the R radical. I.e. a first group which does not contain a methyl group on the pyridine ring, and the second group in which this radical occurs. Generally, the most interesting properties from a pharmacological point of view, among the first group of compounds are furan-2-carboxylic acid 4-pyridylamide hydrochloride (PAF–4) and furan-2-carboxylic acid 2-pyridylamide hydrochloride (PAF–2).

From among the second group, furan-2-carboxylic acid 4-methyl-2-pyridylamide hydrochloride (MePAF) was found to be particularly active.

A common pharmacological feature of all these compounds is the long-lasting pressure action and the more or less remarkable stimulating action upon the central nervous system.

The above noted compounds reveal a relatively low acute toxicity as shown in the following table:

| Compound | $LD_{50}$ | | |
| --- | --- | --- | --- |
| | Per os | Subcutaneously | Peritoneally |
| PAF 4 | Above 600 | About 450 | About 350 |
| PAF 2 | do | 436 | 300 |
| MePAF | 684 | 211 | 224 |

Note.—Stated in mg./kg. in the mouse.

No action on the general behavior of animals (mice or rats) was observed with doses of below 50 mg./kg. The preparation PAF 4 given in higher doses produced tremor in animals, and in doses of above 100 mg./kg. it produced distinct tonic and clonic convulsions. The remaining compounds produced convulsions only in greater toxic doses on the order of 200 mg./kg. and more, when given subcutaneously or peritoneally.

Among the pharmacological effects, firstly there is noted the long lasting increase of the arterial blood pressure after giving the preparations both intravenously and subcutaneously or per os. The strongest action in this respect is revealed by compound MePAF which is superior to the others both in respect of efficacy and long duration of the effect obtained. All the discussed compounds also exert a stimulating action on the breath activity but this effect is not so strong and steady as their pressure action.

| Compound | Minimum active intravenous dose, mg. | Arterial pressure increase after intravenous administration of 10 mg./kg. | | Influence on breath |
| --- | --- | --- | --- | --- |
| | | Mm.Hg | Time in minutes | |
| PAF 4 | 5 | 40 | 20 | +++ |
| PAF 2 | 2.5–5 | 30–40 | 30 | ++ |
| MePAF | 0.25–0.5 | 40–45 | 150–180 | ++ |

Examinations were made on cats in a state of urethan-chloralose anesthesia.

The MePAF reveals a strong pressure action when administered per os. The lowest active dose is about 20 mg., the effect continues, on the average, for more than 3.5 hours. The remaining compounds act in considerably higher doses (35–45 mg./kg.) and their effect is shorter (about 60 minutes).

The above-mentioned compounds also obtain a strong pressure action after an experimental vascular shock with cats as a result of bleeding (blood-letting in a quantity of about 30–40% of the circulating blood). The MePAF reveals the strongest action in this respect.

The pressure effects of the compounds continue also after bilateral removed of the suprarenal bodies.

The pressure action of said compounds disappears almost entirely after making an incision between the medulla oblongata and the medulla spinalis. On the other hand, their effect is inhibited only partly if the incision is made above the vasomotor centers of the bulb, e.g. an incision between the elevations of the quadrigeminal lamina. These results indicate the direct stimulating influence of the compounds upon the vasomotor centers of the brain stem.

The MePAF maintains its strong pressure action in animals which were given large Librium doses producing a considerable drop in arterial pressure in consequence of the inhibition of the pressure centers of the hypothalamus. These examinations were made on cats which were intravenously given 5–10 mg./kg. of Librium and subsequently 5 mg./kg. of MePAF intravenously. It should be emphasized that MePAF and the other compounds intensify the pressure effects produced by electric stimulation of the hypothalamus with cats.

The pressure action of the compounds described above is considerably superior to the effects of known analeptics such as cardiasol, cardiamid, caffeine and bamegrid, but the present compounds are inferior to the action of the "mikoren" preparation as far as the stimulating action on the breath is concerned.

In examinations on dogs the vein sinus of which was cannulated, and on cats (modified Starling's heart-lung preparation) there was also found a distinct influence of compound PAF 2 which intensified the coronary flow. This effect lasts more than one hour and does not depend on the general pressure action.

A distinct increase of the flow through the peripheral vessels (hind extremity of the dog, perfunded preparation in vivo) after administration of said compounds has also been found.

The present compounds examined in doses of up to 10 mg./kg. intravenous with cats do not provoke perceptible alterations in the electrocardiographic picture.

At doses of 20–40 mg./kg., after administration of MePAF, bradycardia and additional contraction of bigeminal rhythm character appear, which disappear after 30–45 minutes. The remaining compounds reveal a similar action. On isolated heart auricles of rabbit, the above-mentioned compounds do not show a more distinct action up to a concentration of $1.10^{-5}$ g./ml.

No more distinct action of the compounds upon the smooth muscles of the ileum of the rabbit and guinea pig has been found. The MePAF as well as the remaining compounds influence, to a very small, statistically unessential degree, the duration of hexobarbital induced anesthesia in mice, nor do they statistically remarkably protect against the toxic doses of this barbiturate ($ED_{99}$). Besides, they exert no distinct influence on the acute toxicity of cardiazol.

A distinct central action of the compounds was found in electroencephalograhic examination on cats. The animals were initially anethetized by means of ether and after the surgical operations together with cortical and subcortical electrode implantation were made, an immobilizing dose of flaxedil (galamine) was given and artificial respiration was employed.

In doses of below 10 mg./kg., MePAF does not reveal any action on the bioelectric activity of the brain. Doses of 20 mg./kg. and higher provoke, after about 1–3 minutes, a desynchronization in the EEC cortical record. After about 30 minutes, in the cortex, hippocampus gyrus, elevation and net formation of the mesencephalon there appear needle discharges of the convulsion type. These effects disappear after about 45 minutes and can also very easily be interrupted by means of doses of pentobarbital (5 mg./kg. intravenously). The PAF 2 compound provokes solely desynchronization symptoms in the EEG but it does not lead to convulsions even in doses of 20–25 mg./kg. intravenously. PAF 4 provokes needle attacks in doses of 10 mg./kg. intravenously.

The effects described above prove a marked pressure action of the compounds, with a relatively inappreciable general excitation of the central nerve system. The pressure effects of the compounds are of central origin, but this action is slightly different from typical effects of analeptic means. For this reason, the furan-2-carboxylic acid derivatives constitute a quite original pharmacological group. The strongest action in this group by far is exhibited by MePAF. It provokes distinct effects in doses about 10 times smaller than that of the other compounds with, in principle, a similar acute toxicity. Its positive feature is therefore a wide therapeutical range. A feature of this compound is also a long-lasting activity and a marked efficacy independently of the way of its administration.

Worthy of special notice in the above-mentioned group of compounds is the coexistence of such pharmacalogical effects as the strong pressure effect and the increase of the coronary flow (independent of the pressure effect) and also the increase of the flow through some peripheral vascular areas (extremities).

What is claimed is:
1. Furan-2-carboxylic acid 4-methyl-2-pyridylamide.
2. Non-toxic salts of the compound as claimed in claim 1.
3. The hydrochloride of the compound as claimed in claim 1.
4. Furan-2-carboxylic acid 4-pyridylamide.
5. Non-toxic salts of the compound as claimed in claim 4.
6. The hydrochloride of the compound as claimed in claim 4.

References Cited
UNITED STATES PATENTS 3,398,155    8/1968    Horrom _____ 260—295 AM

OTHER REFERENCES

Mndzhoyan et al.: Chem. Abstracts, vol. 54 (1), 481–b to 482–b (Jan. 10, 1960).

Chem. Abstracts, Seventh Collective Index, p. 9704.

Mndzhoyan et al.: Chem. Abstracts, vol. 60, 885–C to E; January 1964.

ALAN L. ROTMAN, Primary Examiner

U.S. Cl. X.R.

260—295.5 A; 424—266